Inventor:
Karl C. Schmidt
By: Zabel and Spitzbaugh
Attys.

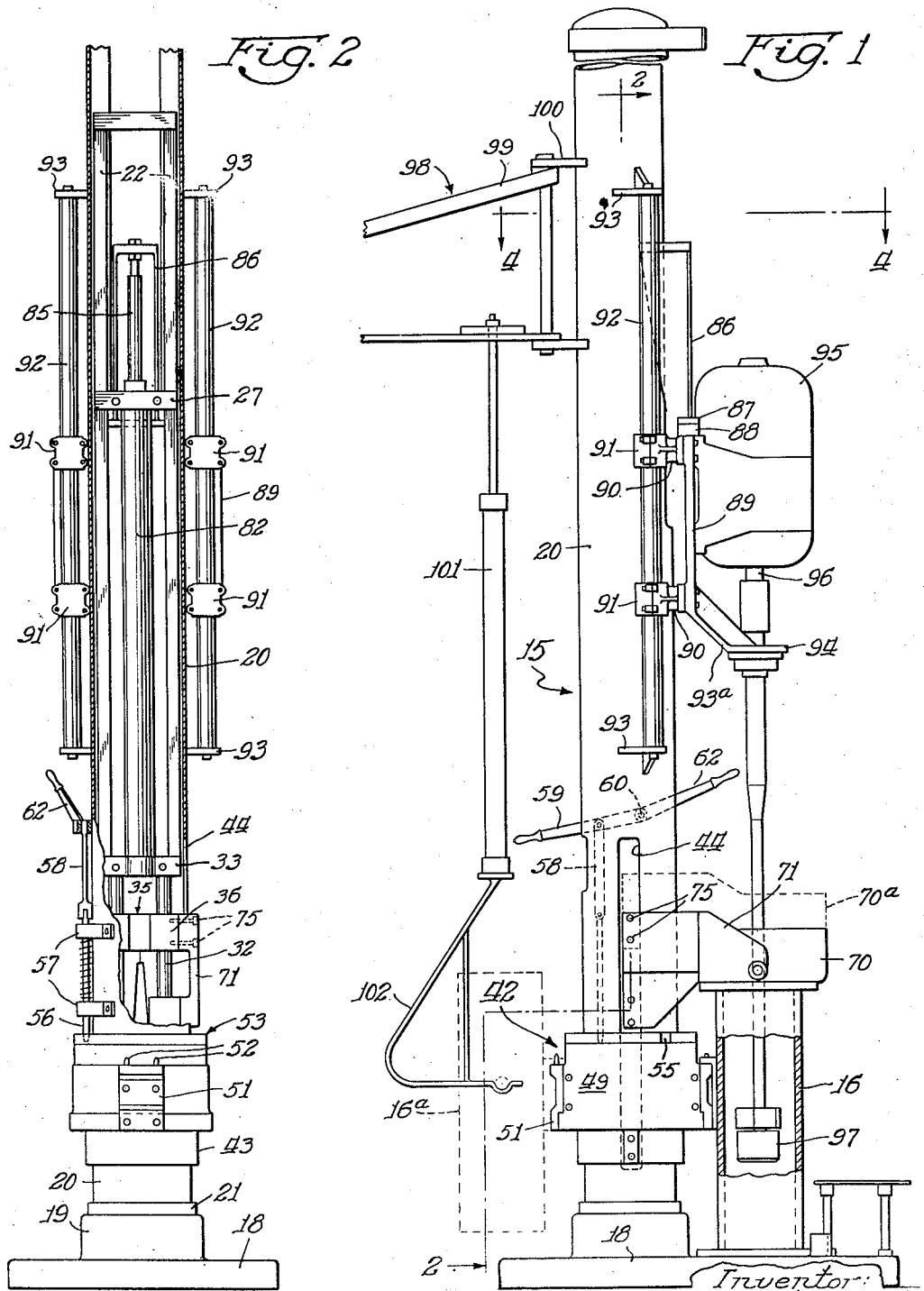

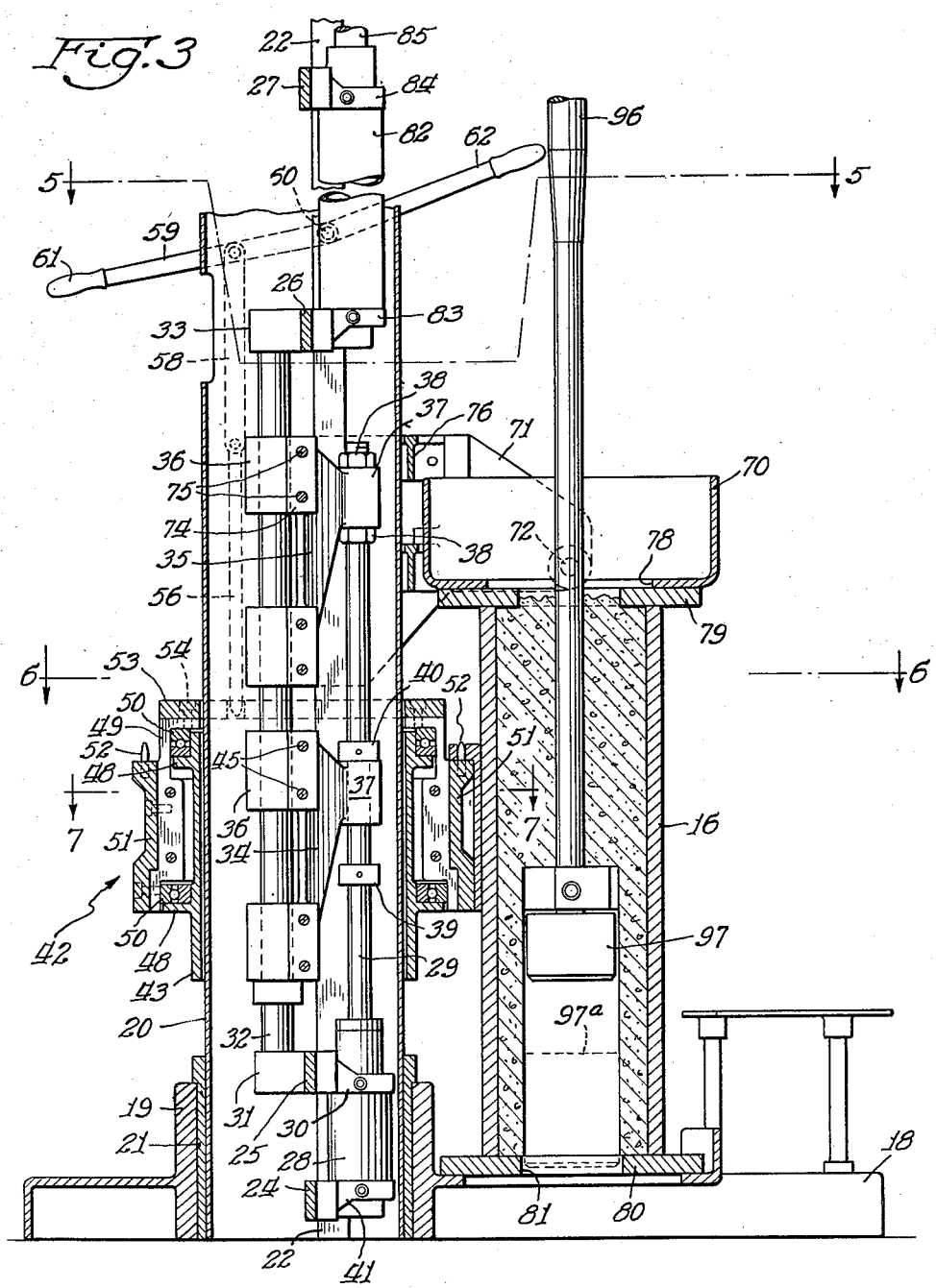

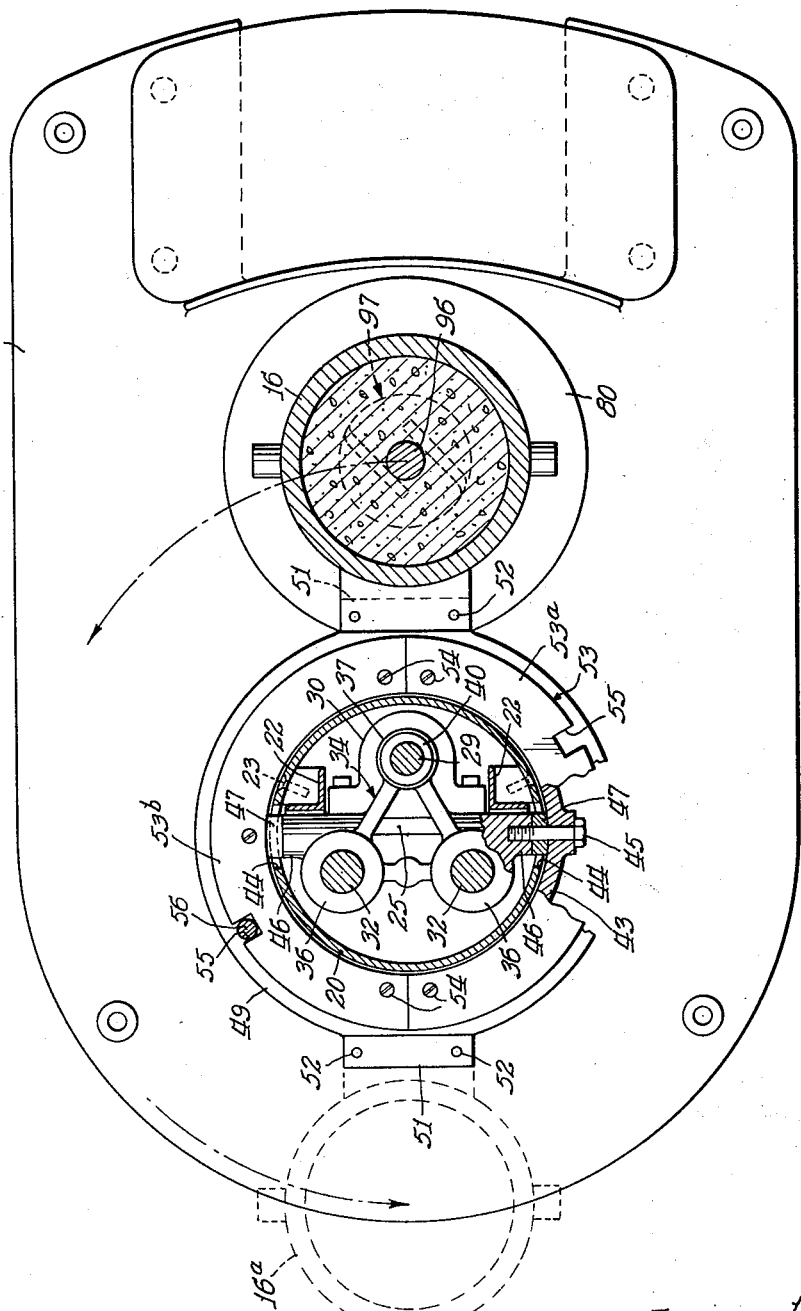

Oct. 10, 1950     K. C. SCHMIDT     2,525,275
MACHINE FOR MOLDING CONCRETE PIPES, HOLLOW
BLOCKS AND THE LIKE
Filed April 30, 1947     5 Sheets-Sheet 5
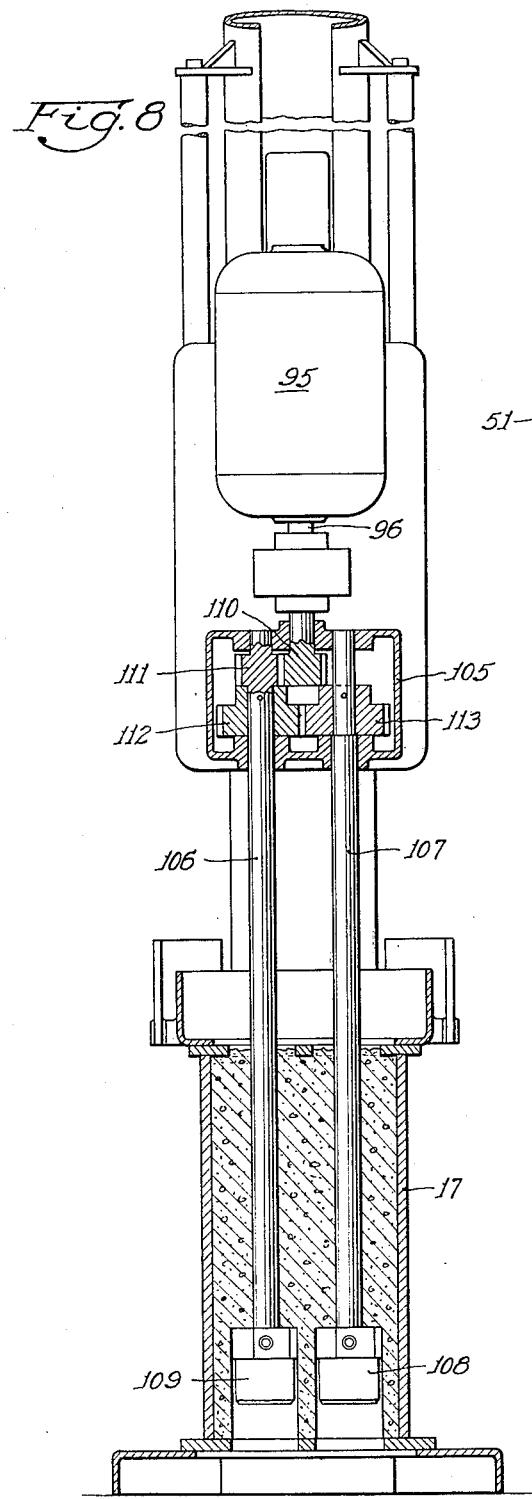
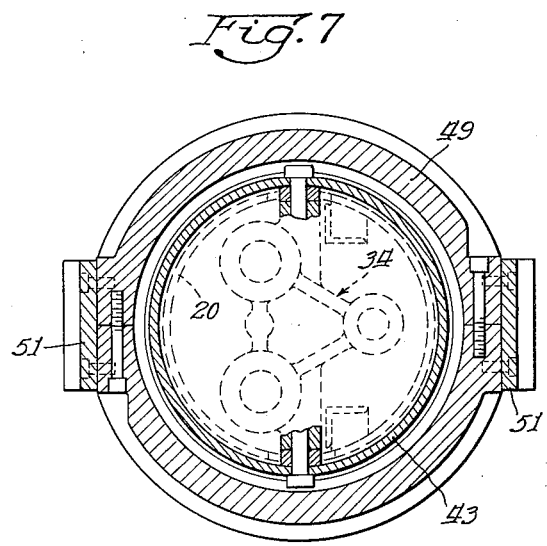
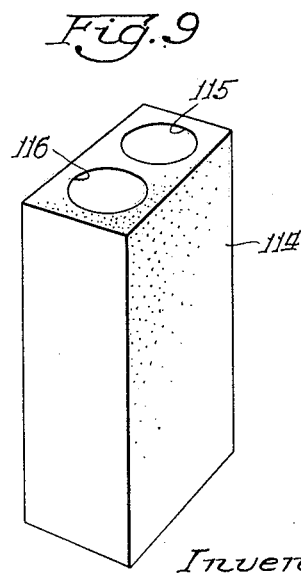
Inventor:
Karl C. Schmidt
By: Zabel and Gritzbaugh
Attys.

Patented Oct. 10, 1950

2,525,275

UNITED STATES PATENT OFFICE 2,525,275

MACHINE FOR MOLDING CONCRETE PIPE, HOLLOW BLOCKS, AND THE LIKE

Karl C. Schmidt, Western Springs, Ill.

Application April 30, 1947, Serial No. 744,841

6 Claims. (Cl. 25—36)

The present invention relates to a molding device for use in the manufacture of concrete tile blocks, slabs, pipe, and the like.

An object of the invention is to provide a machine that will insure uniform high quality in the products it produces. Molds are used for forming the concrete and these molds are supported on a hanger that forms part of the machine. A mold is mounted on the hanger on one side of the machine and then when the machine is placed in operation the mold is automatically lifted by the hanger so that it may be swung into position on a platform where the molding operation is performed. The mold is then clamped down onto the platform and a packer head used in the molding operation is lowered into the mold. All of this is accomplished by means of mechanisms forming part of the molding machine and all of this mechanism is mounted on a frame that is enclosed in a housing. During the molding operation the packer head is slowly raised in the mold while concrete is poured into the mold through the upper end thereof. A feed box engages the top of the mold and serves as the clamp for holding the mold firmly against the platform.

This actual molding operation is conventional but, heretofore, as the packer head approached the top of the mold excess concrete normally has been pushed outwardly between the feed box and the top of the mold. This results in the production of faulty products and, of course, is objectionable. The present invention overcomes this objectionable feature of prior devices by insuring that excess concrete cannot be forced between the feed box and the top of the mold but instead is pulled with the packer head upwardly through the normal opening in the feed box. This is accomplished by virtue of the relationship between the elements making up the present invention and as a result uniform good products are always produced.

The foregoing constitute some of the principal objects and advantages of the present invention, others of which will become apparent from the following description and the drawings, in which Fig. 1 is a side elevational view of the molding machine forming the subject matter of the present invention, a portion of a mold being broken away and shown in section;

Fig. 2 is a vertical sectional view through a portion of the machine shown in Fig. 1, the view being taken on the line 2—2 of Fig. 1;

Fig. 3 is an enlarged vertical sectional view taken through the lower portion only of the molding machine and a mold supported in place on the machine;

Fig. 6 is an enlarged transverse sectional view taken through the machine at a still lower position, the view being taken on the line 6—6 of Fig. 3;

Fig. 7 is an enlarged transverse sectional view through the machine at a position corresponding to the mold hanger, the view being taken on the line 7—7 of Fig. 3;

Fig. 8 is a fragmentary elevational view shown partly in section illustrating a modified embodiment of the invention wherein two packer heads are employed; and Fig. 9 is a perspective view of a slab that is made with the modified machine shown in Fig. 8.

Figure 4:
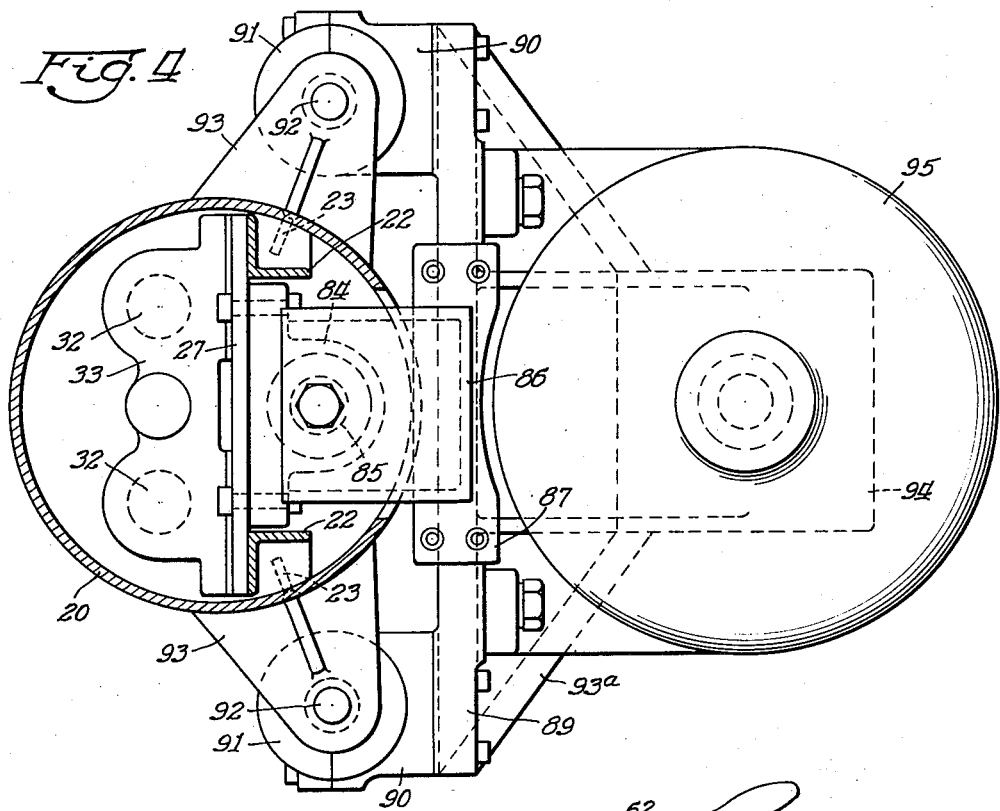
Fig. 4 is an enlarged transverse sectional view through the upper portion of the molding machine, the view being taken on the line 4—4 of Fig. 1.

For purposes of illustration specific embodiments of the present invention have been selected and will be described hereinafter, though it is recognized that many modifications may be made in the specific embodiments shown without departing from the intended scope of the invention.

Referring now to the drawings and particularly to Figs. 1 to 4 inclusive the molding machine is illustrated generally at 15 and a mold employed with said machine for making concrete blocks or slabs is indicated at 16 in Fig. 1 or at 17 in Fig. 8.

The molding machine 15 comprises a base 18 that includes a socket portion 19 that is adapted to receive an upstanding cylindrical housing 20. A sleeve 21 is disposed between the portion 19 and the cylindrical housing 20.

Figure 5:
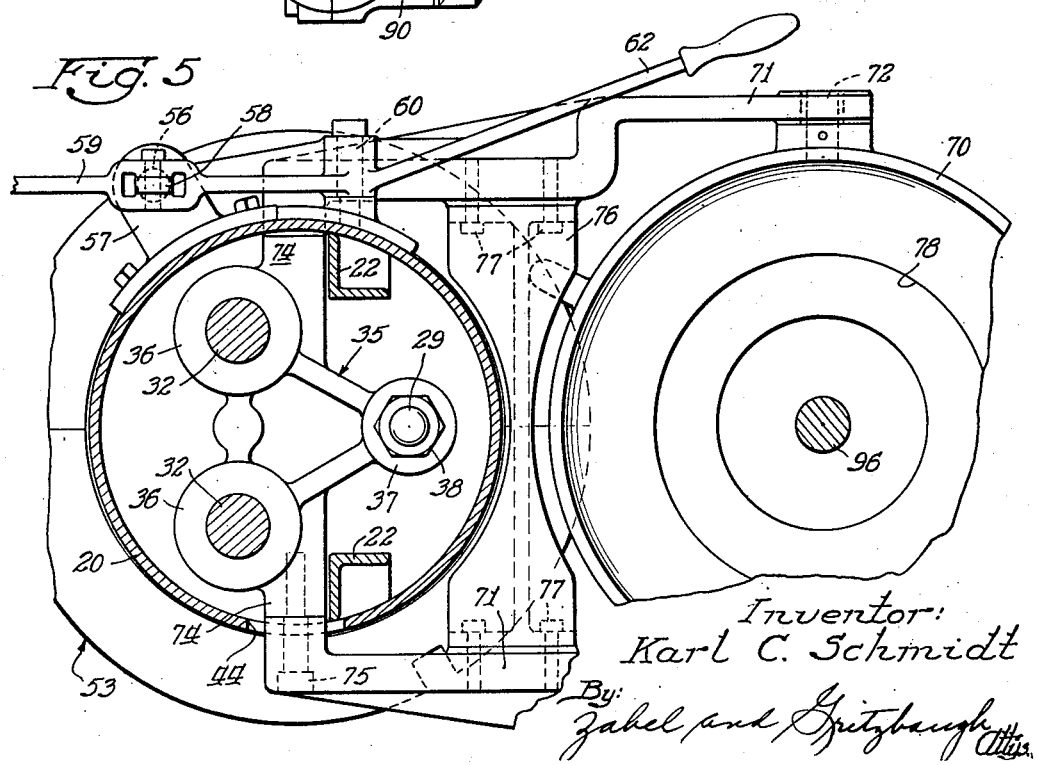
Fig. 5 is an enlarged transverse sectional view taken through the molding machine at a lower position, the view being taken on the line 5—5 of Fig. 3.

As best shown in Figs. 3, 4 and 5 a framework comprising a pair of spaced upright angle members 22 is disposed inside the cylindrical housing 20 and this framework is adapted to be rigidly secured to the housing 20 by means of screws, one of which is illustrated at 23 in Fig. 4. The spaced upright angle members 22 are connected by a plurality of cross ties or plates 24, 25, 26 and 27 best shown in Figs. 3 and 4.

Secured to the lower cross tie 24 at a position adjacent to the bottom of the housing 20 is a lower supporting bracket 41 that supports the lower end of a cylinder 28. This cylinder is provided with a piston (not shown) that is connected to one end of a plunger 29 that projects upwardly in the housing 20. An upper supporting bracket 30 supports the upper end of the cylinder 28 and is suitably fastened to the cross tie 25.

A lower guide post supporting casting 31 is secured to the cross tie 25 and is adapted to support the lower ends of a pair of spaced guide posts 32 (see Fig. 6). An upper supporting casting 33 is fastened to the upper cross tie 26 and is adapted to support the upper ends of the guide posts 32. Mounted on the guide post 32 is a pair of lifting brackets 34 and 35, being more or less triangular in shape and being provided at two of its apexes with collars 36 that are adapted to be slidably mounted on the guide posts 32. At the third apex of each triangular shaped bracket 34 or 35 is a third collar member 37. This third collar member 37 on each of the brackets 34 and 35 is mounted loosely on the plunger 29 (see Fig. 3) so that the plunger is free to slide vertically in each of the collar members 37. The upper end of the plunger 29 is threaded so as to receive nuts 38 above and below the collar 37. Thus by proper adjustment of the nuts 38 the collar member 37 may be fixed with respect to the plunger 29. A pair of stops 39 and 40 are fixed to the plunger 29, the stop 39 being disposed below the collar 37 on the bracket 34, whereas the stop 40 is disposed above the collar 37. The spacing of these stops 39 and 40 with respect to the collar 37 on the lower bracket 34 is such that as best indicated in Fig. 3 the plunger 29 may be raised a certain distance for example, approximately two and one-half inches, before the lower stop 39 engages the lower face of the collar 37.

Mounted concentrically about the cylindrical housing 20 adjacent to the lower end thereof is a mold hanger sleeve assembly generally indicated at 42 best shown in Figs. 1 to 3 inclusive and Fig. 7. This hanger sleeve includes a sleeve 43 that is mounted concentrically about the housing 20 and is adapted to slide vertically on this housing. A pair of vertical slots 44 (Fig. 6) is provided in the housing 20 in the diametrically opposite sides thereof, and the sleeve 43 is fixed to the lower bracket 34 by means of vertical screws 45 that pass through the vertical slots 44 into bosses 46 that are fixed with respect to the bracket 34. A spacer block 47 is disposed in each of the slots 44 between the sleeve 43 and the corresponding boss 46.

Again referring to Fig. 3 the sleeve 43 is provided with upper and lower annular flanges 48 on which is mounted a rotatable sleeve 49. Ball bearing units 50 are mounted between this rotatable sleeve 49 and the upper and lower flanges 48. Fixed to this rotatable sleeve 49 is a pair of hanger brackets 51, each of which is provided with upstanding spaced hanger pegs 52 (see Figs. 1, 2, 3 and 6). These hanger brackets 51 are disposed on the diametrically opposite sides of the rotatable sleeve 49. Thus there is provided hanger sleeves 51 that are adapted to rotate with a rotatable sleeve 49 about a non-rotatable sleeve 43.

An indexing ring 53 (see Figs. 3 and 6) made up of segments 53a and 53b is screwed as at 54 onto the upper face of the rotatable sleeve 49. This indexing ring 53 is provided with a pair of indexing slots 55 disposed 180 degrees apart about the circumference of the indexing ring 53. As best shown in Figs. 1, 2, 3 and 6 an indexing pin 56 is adapted to be inserted in either of the indexing slots 55 and this pin 56 is slidably supported in a pair of spaced brackets 57 best shown in Fig. 2. Pivotally secured to the upper end of the indexing pin 56 is an operating lever 58 which in turn is secured at its upper end to an operating arm 59. This operating arm 59 is fulcrumed at 60 as best shown in Fig. 5 and is provided with a hand grip 61 at one end thereof as best shown in Fig. 3. A second arm 62 forms an extension of arm 59 and projects in the opposite direction so that the indexing pin 56 may be operated from either side of the machine. Thus by raising the arm 61 (see Fig. 3) or by lowering the arm 62 about the fulcrum 60 the indexing pin 56 is raised out of the indexing slot 55 so that the hanger brackets 52 may be rotated with the rotatable sleeve 49 about the housing 20 and by inserting the indexing pin 56 in the second indexing slot 55 after completion of an 180 degree revolution of the rotatable sleeve 49 the two hanger brackets 51 change places, so to speak, in their positions with respect to the stationary housing 20.

Referring to Figs. 1, 3 and 5 a feed box 70 is mounted between spaced arms 71 and secured to these arms in some suitable fashion as indicated at 72. The free ends of the arms 71 pass through vertical slots 44 in the cylindrical housing 20 and are secured to bosses 74 that are provided on the upper lifting bracket 35. This securing means is accomplished by suitable screws 75. A brace 76 reinforces the arms 71 intermediate their ends and this brace is fastened by means of screws 77 to the arms.

The feed box 70 is provided with a central aperture 78 in the bottom wall thereof and an annular clamping plate 79 is mounted on the bottom face of the feed box 70. The apertures 78 in the feed box 70 and the aperture in the annular clamping plate 79 provide a passage through the bottom of the feed box 70 through which concrete may be poured in a manner to be described hereinafter.

Thus there is provided by means of the plunger 29 together with the lower and upper brackets 34 and 35 lifting means for the hanger sleeve 42 and for the feed box 70. As the plunger 29 is raised by the operation of the cylinder 28 the bracket 35 is lifted immediately so as to cause the feed box 70 to rise. Because of the relationship between the stops 39 and 40 the plunger 29 moves upwardly through a distance of approximately two and one-half inches before the lower stop 39 engages collar member 37 to commence lifting the lower bracket 34. Upon continued upward movement of the plunger 29 the hanger sleeve 42 is lifted along with the feed box 70.

A mold platform 80 is disposed on the base 18 below the clamping plate 79 as best shown in Fig. 3 and a mold 16 is adapted to rest on the platform 80 as shown. When the feed box 70 is disposed in the position shown in Fig. 3 with the clamping plate 79 urged against the top of the mold 16 this mold is clamped between the clamping plate 79 and the lower platform 80. This platform 80 is annular in form so as to be provided with a central aperture 81.

Referring to Fig. 3 an upper cylinder 82 is disposed in the housing 20 and is mounted between lower and upper mounting brackets 83 and 84 that are attached to cross ties 26 and 27 respectively. An upwardly extending plunger 85 operates in the cylinder 82 and at the top of the plunger 85 is fastened a motor connecting member 86. This motor connecting member 86 includes a lower attaching plate 87 that is fastened to a bracket plate 88 that forms part of a motor mounting plate 89. This mounting plate 89 includes rearwardly extending portions 90 that are provided with collars 91 (see Figs. 1, 2 and 4) that are adapted to ride up and down along a pair of guide posts 92 that are secured to the cylindrical housing 20 by means of attaching members 93. The motor mounting plate is provided with a downwardly extending arm 93a that carries at its lower end a shaft bearing 94. An electric motor 95 is suitably mounted on the mounting plate 89 and is provided with a downwardly extending motor shaft 96 that passes through the bearing 94. This shaft 96 is provided at its lower end with a packer head 97 of any suitable type, such as commonly used in connection with the molding of concrete, pipe or drain tile.

The upper cylinder 82 is adapted to raise and lower the plunger 85 so as to raise and lower the motor 95 with its downwardly extending shaft 96. This permits the packer head 97 to be lowered into the mold 16 that is disposed on the supporting platform 80 and thus permits the molding operation to be performed.

A suitable mold handling device generally indicated at 98 in Fig. 1 may be provided. This device may be of any well-known type that may include an overhead track portion 99 that is supported as at 100 onto the cylindrical housing 20 of the molding machine. A downwardly projecting arm 101 carries a mold handling claw member 102 at its lower end.

*Operation*

Thus there is provided an effective molding machine for concrete that is adapted to guarantee satisfactory hollow tile and like concrete products. In the operation of the machine the feed box 70 is initially disposed in its elevated position indicated in broken lines at 70a in Fig. 1 and the motor 95 is initially disposed in its uppermost position with the packer head 97 located above the feed box 70. A mold 16 is now supported on the hanger sleeve 42 and is swung into position over the platform 80. The indexing pin 56 is then inserted in the corresponding indexing slot 55 so that the mold 16 on the hanger sleeve is locked into position over the platform 80.

The lower and upper cylinders 28 and 82 respectively may be hydraulically or air operated. When the mold 16 is disposed over the platform 80 the lower cylinder 28 is operated so as to lower the plunger 29 and during the first operation of this movement both the mold 16 and feed box 70 are moved downwardly, though the clamping plate 79 of the feed box 70 is spaced above the mold 16 approximately two and one-half inches. When the mold 16 has been placed on the platform 80 the plunger 29 continues to move downwardly until the clamping plate 79 engages the upper edge of the mold 16 and firmly clamps the mold 16 in place on the platform 80.

The upper cylinder 82 is next placed into operation so as to lower the packer head 97 into the mold 16 until it reaches the lowermost position in the mold 16 illustrated in broken lines at 97a in Fig. 3. In this lowermost position it is to be noted that the bottom of the packer head 97a is actually disposed part way in the aperture 81 in the platform 80 and effectively closes this aperture. The concrete is now ready to be poured into the feed box 70 and allowed to pass through the openings in the bottom of the feed box and the clamping plate 79 and be discharged into the mold 16. As the concrete is thus being poured into the mold 16 the packer head 97 is rotated by the motor 95 and at the same time the packer head is lifted by the operation of the upper cylinder 82. The function of the packer head 97 is to uniformly pack the concrete in the mold 16 in the region about the periphery of the packer head. The packer head 97 is slowly raised throughout the entire height of the mold 16 and is finally withdrawn through the clamping plate 79 and in the bottom of the feed box 70, during which entire operation concrete is being poured through the feed box 70.

The lower cylinder 28 is adapted to provide a greater downward force on the feed box than the lifting force of the upper cylinder 82. This is accomplished by providing a larger effective piston area in the cylinder 28 than in the upper cylinder 82 so that the clamping force of the clamping plate 79 on the mold 16 is greater than the lifting force exerted by the packer head 97. Thus as the packer head 97 approaches the top of the mold 16 the normal tendency for concrete to be squeezed outwardly between the upper edge of the mold 16 and the lower face of the clamping plate 79 is overcome by virtue of this greater downward force exerted by the clamping plate 79. The ultimate product manufactured by this machine is, therefore, uniform throughout its entire height.

Referring to Fig. 8 a modified machine is provided. In this form of the invention the downwardly projecting shaft 96 of the motor 95 enters a gear box 105. A pair of packer head shafts 106 and 107 project downwardly from the gear box 105 so that in this form of the invention there are provided two packer heads 108 and 109 instead of the single packer head 97 illustrated in the first embodiment of the invention. A suitable gear 110 is provided on the lower end of the motor shaft 96 that meshes with a gear 111 on the top of shaft 106 and a second gear 112 is disposed on the shaft 106 in the gear box 105. A gear 113 is mounted on the shaft 107 and is adapted to move with gear 112. Thus shafts 106 and 107 are rotated by the motor shafts 96 through gears 110, 111 and 112, 113. In this form of the invention a concrete tile or slab of the type illustrated at 114 in Fig. 9 is produced and as shown is provided with two longitudinal apertures 115 and 116 that are formed by the two packer heads 108 and 109.

After the molding operation has been completed the packer head 95 is further raised by the upper cylinder 82, then the lower cylinder is operated so as to lift the feed box 70 and after approximately two and one-half inches of upward movement of this feed box the mold 16 is lifted approximately two and one-half inches off of the end of platform 80. The indexing pin 56 is then raised from the indexing slot 55 and the hanger sleeve 42 is rotated so as to place an empty mold 16 in place over the platform 80, at which time the hanger sleeve is again locked by lowering the pin 56 into the indexing slot. The full mold 16 that is now disposed as indicated in broken lines at 16a in Fig. 1 is lifted off the hanger sleeve 42 and is removed from the machine by the mold handling device 98.

Both the lower and the upper cylinders operate in both directions under the pressure of the actuating air or oil. Any conventional three-way valves for accomplishing this can be employed along with suitable piping (not shown).

I claim:

1. A molding machine of the class described comprising an upright standard, a mold hanger, a feed box above the hanger, and a packer head assembly, a first cylinder having a vertically operating plunger, a second cylinder having a vertically operating plunger, means mounting the mold hanger on the first plunger so that the mold hanger moves with the first plunger, means independent of the first means mounting the feed box on the first plunger, and means mounting the packer head assembly on the second plunger so that the packer head assembly moves with the second plunger, the first plunger being adapted to exert a greater force against the feed box than the second plunger exerts on the packer head assembly.

2. A molding machine of the class described comprising an upright housing, a vertical frame in the housing, a mold hanger disposed outside the housing, a feed box mounted outside the housing and a packer head assembly mounted outside the housing, a first cylinder in the housing having a vertically operating plunger, a second cylinder having a vertically operating plunger, means inside the housing mounting the mold hanger on the first plunger, means inside the housing mounting the feed box on the first plunger, and means inside the housing mounting the packer head assembly on the second plunger, both cylinders being mounted on the frame, the first plunger being adapted to exert a greater force than the second plunger.

3. A molding machine of the class desribed comprising an upright standard, a mold hanger, a feed box, and a packer head assembly, a first cylinder having a vertically operating plunger, a second cylinder having a vertically operating plunger, means mounting the mold hanger on the first plunger, means mounting the feed box on the first plunger, and means mounting the packer head assembly on the second plunger.

4. A molding machine of the class described comprising an upright housing, a vertical frame in the housing, a mold hanger disposed outside the housing, a feed box mounted outside the housing and a packer head assembly mounted outside the housing, a first cylinder in the housing having a vertically operating plunger, a second cylinder having a vertically operating plunger, means inside the housing mounting the mold hanger on the first plunger, means inside the housing mounting the feed box on the first plunger, and means inside the housing mounting the packer head assembly on the second plunger, both cylinders being mounted on the frame.

5. A molding machine of the class described comprising an upright housing, a packer head assembly including a motor and a motor support, a supporting frame in the housing, a cylinder in the housing supported on the frame and having a vertically operating plunger, and means for attaching the motor support to the plunger.

6. A molding machine of the class described comprising a cylinder having a vertically operating plunger, a second cylinder having a vertically operating plunger disposed in horizontal spaced relationship with respect to the first plunger, a platform, a feed box disposed above and spaced from the platform, means mounting the feed box on the first plunger so that upward and downward movement of the plunger imparts upward and downward movement to the feed box, the feed box being provided with an opening, a packer head assembly adapted to pass through the opening in the feed box and to project below the feed box, and means mounting the packer head assembly on the second plunger so that upward and downward movement of the second plunger imparts upward and downward movement to the packer head assembly, the first cylinder being adapted to exert a downward force on the feed box while at the same time the second cylinder exerts an upward force on the packer head assembly, the two cylinders being so organized and arranged that the first cylinder exerts a greater force than the second cylinder.

KARL C. SCHMIDT.

REFERENCES CITED

The following references are of record in the file of this patent:

UNITED STATES PATENTS

| Number | Name | Date |
| --- | --- | --- |
| 1,048,689 | Hammond, Jr. | Dec. 31, 1912 |
| 1,596,203 | Martin | Aug. 17, 1926 |
| 2,442,517 | Slaton | June 1, 1948 |